(12) United States Patent
Slocum, Sr. et al.

(10) Patent No.: US 8,397,577 B2
(45) Date of Patent: Mar. 19, 2013

(54) ROLLING DIAPHRAGM PRESSURE SENSOR

(76) Inventors: Alexander Henry Slocum, Sr., Bow, NH (US); Alexander Henry Slocum, Jr., Huntington, WV (US)

(*) Notice: Subject to any disclaimer, the term of this patent is extended or adjusted under 35 U.S.C. 154(b) by 111 days.

(21) Appl. No.: 13/041,421

(22) Filed: Mar. 6, 2011

(65) Prior Publication Data

US 2012/0222488 A1   Sep. 6, 2012

(51) Int. Cl.
  *G01L 7/08*  (2006.01)
  *F16J 15/50*  (2006.01)
(52) U.S. Cl. .......................... 73/715; 267/122
(58) Field of Classification Search ............. 73/700–756
  See application file for complete search history.

(56) References Cited

U.S. PATENT DOCUMENTS

| | | | |
|---|---|---|---|
| 3,911,904 A | 10/1975 | Saba | |
| 4,114,458 A | 9/1978 | Alinari | |
| 4,449,113 A * | 5/1984 | Gould et al. | 338/39 |
| 4,501,273 A | 2/1985 | McGinnis | |
| 4,844,486 A | 7/1989 | Schiemann | |
| 4,966,035 A | 10/1990 | Huang | |
| 5,103,670 A | 4/1992 | Wu et al. | |
| 5,336,183 A | 8/1994 | Greelis et al. | |
| 5,439,178 A | 8/1995 | Peterson | |
| 5,722,955 A | 3/1998 | Racz | |
| 5,935,084 A | 8/1999 | Southworth | |
| 6,042,092 A | 3/2000 | Shibata | |
| 6,485,471 B1 | 11/2002 | Zivitz et al. | |
| 6,595,051 B1 * | 7/2003 | Chandler, Jr. | 73/301 |
| 7,018,359 B2 | 3/2006 | Igarashi et al. | |
| 7,383,736 B2 | 6/2008 | Esnouf | |
| 2002/0198545 A1 * | 12/2002 | Hess et al. | 606/149 |
| 2012/0209111 A1 * | 8/2012 | Cowan et al. | 600/432 |

FOREIGN PATENT DOCUMENTS

EP    1195545 A2    4/2002

* cited by examiner

*Primary Examiner* — Andre Allen
(74) *Attorney, Agent, or Firm* — Rajesh Vallabh; Foley Hoag LLP

(57) ABSTRACT

A system for measuring and indicating pressure that uses as its pressure sensing element an outer resilient tube, an inner resilient tube, and a rolling diaphragm connecting the inner and outer tubes, and held inside a protective enshrouding structure where pressure applied to the annulus between the tubes causes the diaphragm to deform and roll to axial extend the outer tube by an amount proportional to the applied pressure. The structure has features that enable visual correlation of the partially rolled tube's unrolled state with the applied pressure. The system can be incorporated into a syringe to create a pressure measuring syringe for inflating endotracheal cuffs while providing a reading of the cuff pressure.

21 Claims, 6 Drawing Sheets

ROLLING DIAPHRAGM PRESSURE SENSOR

The present invention relates to a device for very fine pressure measurements, either of very low pressures or of pressures with very high accuracy where the pressure causes a rolling diaphragm to change the observable length in an outer tube.

STATEMENT REGARDING FEDERALLY FUNDED RESEARCH

No federal funds were used in the development of this invention

FIELD OF THE INVENTION

The present invention relates to the measurement of pressure where pressure causes a rolling diaphragm to change the observable length in an outer tube.

BACKGROUND OF THE INVENTION

There are a great many instruments for measuring pressure and fundamentally many rely on pressure causing mechanical deformation of a mechanical structure which then causes an indicator to move which allows the user to observe a value of pressure. In some fields, such as medical devices or where extreme purity of gases must be maintained, it is important to measure pressure with a single element that can be made from a material compatible with the application. Conventional bellows can be used to measure pressure by visually monitoring extension of the bellows; however, bellows are difficult to manufacture with thin enough walls for measuring very low pressures, and variations in wall thickness during manufacturing can lead to significant variations in pressure sensitivity. A 10% variation in wall thickness can lead to 20% or more variation in pressure indicated depending on the design of the bellows' convolutions. One of the causes of wall thickness variation is the difficulty with which the convolutions are made; most bellows are made using blow molding which does not lead to accurate wall thickness, particularly in the corners, and error in thickness in the corners leads to variation in effective diameter. The diameter of a plate, which the convolution effectively is with regard to predicting compliance, varies with the diameter squared. Material thickness variation in the acute angle of the corners where two convolutions meet is typically much greater than the thickness variation on the plate region; hence it causes a more significant variation in the effective plate diameter and hence compliance of the bellows. This makes measurement of very small pressures, on the order of millibar to centibars, very difficult.

If the bellows can be injection molded, greater thickness control can be obtained, but then the issue is how to remove the bellows from the mold without breaking the bellows? This is done by making the convolutions not too deep so the bellows will not be stretched too much when removing it from the mold core. Once again, it becomes difficult to make thin bellows for accurate low pressure measurement.

U.S. Pat. No. 4,844,486 describes a spiral bellows to act as a boot to cover a joint. The spiral shape helps to return lubricant to the joint as it is shed by the rotating joint. The spiral helps with manufacture and provides good axial compliance. European patent EP1195545 describes a spiral bellows for a fluid conduit, where the spiral bellows form creates less noise when fluids flow through the bellows than if a conventional bellows were used. These bellows, however, have a very shallow convolution depth and are meant not for measuring pressure but to allow lateral flexibility. Hence they would be poor for measuring pressure.

U.S. Pat. No. 7,383,736 describes the use of a conventional circular cross section bellows for use as a pressure sensor, wherein the end of the bellows is close to the wall of an enshrouding chamber. The bellows is operated as an inside out pressure sensor, where the pressure on the inside of the bellows is maintained at atmospheric by connection to the outside world, the pressure on the outside of the bellows is that of the pressure source. Hence with increasing pressure, the bellows compresses. No structure is perfect, and hence pressure will cause some radial motion and thus contact between the end of the bellows and the outer wall. For larger pressures the bellows will tip and make contact with the wall of the enshrouding structure, and the resultant drag force will create an error in pressure measurement. The patent shows an increase in the bellows end diameter or a connection between the bellow's end and a piston which are both attempts to keep the bellows centered, but no matter what, if there is mechanical contact, and upon application of pressure there will be, there will be a parasitic friction force that causes error in pressure measurement. Furthermore, in this compression design, the wall thickness of the bellows cannot be too thin or in compression the bellows will buckle; hence it is inherently limited in how small a pressure it can sense while providing reasonable amount of axial compression so as to make it easy to discern visually by the user.

U.S. Pat. No. 3,911,904 is a sphygmomanometer where instead of a column of mercury, a balloon constrained on its sides by walls of a chamber is allowed to expand axially to indicate pressure. The only problem is that the device simply will not work because the balloon will not expand in a near fashion with pressure because the physical contact of the balloon with the chamber walls will constrain it and prevent it from extending axially.

U.S. Pat. No. 4,501,273 is a device that connects to a syringe that forms a cavity where the extension of a bladder within the cavity is controlled by constant force springs, such that the device maintains constant pressure in a endotracheal cuff. The device does not measure pressure, nor can it, but it acts as a relief valve/capacitor. This addresses the issue of controlling endotracheal cuff pressure in a very different way, and does not enable the doctor to change the pressure in accordance with what the patient or procedure may require.

U.S. Pat. No. 5,103,670 is from the family of pressure gage instruments where the function of the bellows is to contain the air pressure and transfer the forces to an indicator (rotary) mechanism, but as such the mechanism has considerable sliding friction and hence there will be substantial errors in measurement for low pressures. As this device is indicated for measuring tire pressure, the error sin measurement could be expected to be tolerable for that application. U.S. Pat. No. 4,114,458 functions in a similar manner and has similar fatal drawbacks with regard to precision pressure measurement. U.S. Pat. No. 4,966,035 replaces the bellows with a spring, piston and seal and thus has even greater parasitic errors.

U.S. Pat. No. 5,336,183 shows a syringe with a secondary pressure measurement chamber in parallel where pressure is sensed by a piston constrained radially by seals with the enclosing chamber, and axially by a spring. Hence any pressure forces generated will first have to overcome the static friction sealing forces and a large error in measurement will occur.

U.S. Pat. No. 5,722,955 shows a syringe with its plunger's distal end affixed with a pressure sensitive open cell foam material coated with an impermeable membrane; however, this means that the compression will be proportional to pressure. Hence it might only present a reasonable visual displacement for a substantial fraction of one atmosphere of pressure. Furthermore, it will not provide the same reading in Denver as in Los Angeles or anyplace where the barometric pressure is different than from where it was manufactured.

U.S. Pat. No. 6,485,471 shows a plunger used to push on a bellows, thus expelling the contents. Since the bellows elasticity is in series with the plunger and the fluid line leading from it, there is no way to ascertain what portion of the force on the plunger is due to the pressure in the line and that due to the elasticity of the bellows. In addition, lateral motion of the plunger would create contact with the enshrouding cylinder walls creating a parasitic force further reducing accuracy. U.S. Pat. No. 6,042,092 shows a similar device where the bellows is intended to provide a spring return force to a plunger, this time with a toggle linkage also present. Once again, there can be no true accurate indication of pressure. U.S. Pat. No. 7,018,359, U.S. Pat. No. 5,439,178 and U.S. Pat. No. 5,935,084 are also of similar design with regard to the placement And action of forces and thus have similar shortcomings that prevent it being able to provide accurate pressure readings.

Furthermore, there is a fundamental problem associated with using an axially compliant cantilevered member to measure pressure: axial compliance equates to a low effective modulus of elasticity, which in turn means that gravity will cause any such structure to sag considerably under its own weight; although the modulus of elasticity of the rubber in a bellows may be several MPa, the convolutions make it effectively to be orders of magnitude lower so that any cantilever beam loaded under its own weight but having such a low modulus will droop substantially. Once the drooping structure makes contact with the walls of a protective enclosure, a parasitic frictional force will be encountered which can cause significant pressure measurement errors if very fine pressure measurements attempted.

In addition, a bellows-type pressure sensor must start with a large volume to provide structure that can then elastically deform. This large volume is undesirable if a fluid is the working media because the fluid must then be disposed of if the application is single use. For many medical applications, this adds to the mass of material that has to be treated as bio-waste.

What is desired is a movable structure whose motion is proportional to pressure applied. In the case of the application to a pressure measuring syringe, the motion of the syringe plunger ideally would cause the motion of the movable structure as pressure is increased. The movable structure could be attached to the syringe plunger or to a secondary structure attached to the syringe or line coming from the syringe. When thinking of a structure that moves when pressure is applied, one thinks of a piston, yet static friction must be eliminated. To one skilled in the art of pistons and seals, motion without friction can be accomplished by a rolling diaphragm seal; however, these seals are noted for having a very low constant force resistance, hardly suitable for pressure measurement.

These limitations are overcome in the present invention with the use of a resilient outer tube and an inner resilient closed-end tube connected by a resilient rolling diaphragm, where at least one of the outer or inner tubes or the wall thickness tapers. By tapering either or both of the tubes and/or/nor the thickness the sensitivity and linearity of the device to pressure can be controlled.

OBJECTS OF THE INVENTION

A principal object of this invention is to provide a new and improved sensor for measuring pressure using a rolling diaphragm connecting an outer tube and an inner closed-end tube where the annulus between the tubes is connected to the pressure source whose magnitude is to be measured.

Another object of the invention is to taper at least one of the outer or inner tubes or the wall thickness so the sensitivity and linearity of the device to pressure can be controlled.

A further object of this invention is to provide an enshrouding structure to hold the sensor and enable it to be in communication with the pressure source.

Another object is to provide an enshrouding protective structure with relative motion observation features to enable visual observation of the sensor as it is pressurized and unrolls to enable a user to visually determine the amount of pressure applied.

A still further object of the invention is to provide a sensor where the sensor when pressurized inside its enshrouding protective structure and held in any orientation will not suffer from any friction forces that substantially affect its ability to unroll in response to any applied pressure to be sensed; where in fact increased pressure pushes the outer tube up against the enshrouding structure to support it and give a clear and accurate reading of pressure.

A still further object of the invention is that it can be incorporated into the plunger of a syringe were sealing forces between the plunger and outer barrel can provide an excellent seal, and also create static friction forces to maintain the plunger's axial position when finger forces are removed from the plunger, thus allowing a user to periodically visually check the pressure and if needed, adjust the position of the plunger to maintain position while indicating a true and accurate pressure reading proportional to the sensor's extension.

Other and further objects will be explained hereinafter and more particularly delineated in the appended claims.

SUMMARY

In summary, the invention includes rolling diaphragm that connects and inner closed end tube and an outer tube, where at least one of the outer or inner tubes or the wall thickness are tapered so the sensitivity and linearity of the device to pressure can be controlled.

DRAWINGS

The present invention can best be understood in conjunction with the accompanying drawing, in which.

In the drawings, preferred embodiments of the invention are illustrated by way of example, it being expressly understood that the description and drawings are only for the purpose of illustration and preferred designs, and are not intended as a definition of the limits of the invention.

PREFERRED EMBODIMENT(S) OF THE INVENTION

The preferred embodiment herein will be discussed with regard to the size of a typical syringe used to inflate an endotracheal tube (ET) cuff used when a patient is intubated; hence it must work with a syringe which typically has a barrel inside diameter of about 16 mm and a length of 75 mm. However, the results are scalable to other applications and pressures, such as for inflation of cuffs for pediatric and neonatal ET tubes.

Figures 1A, 1B, 1C:
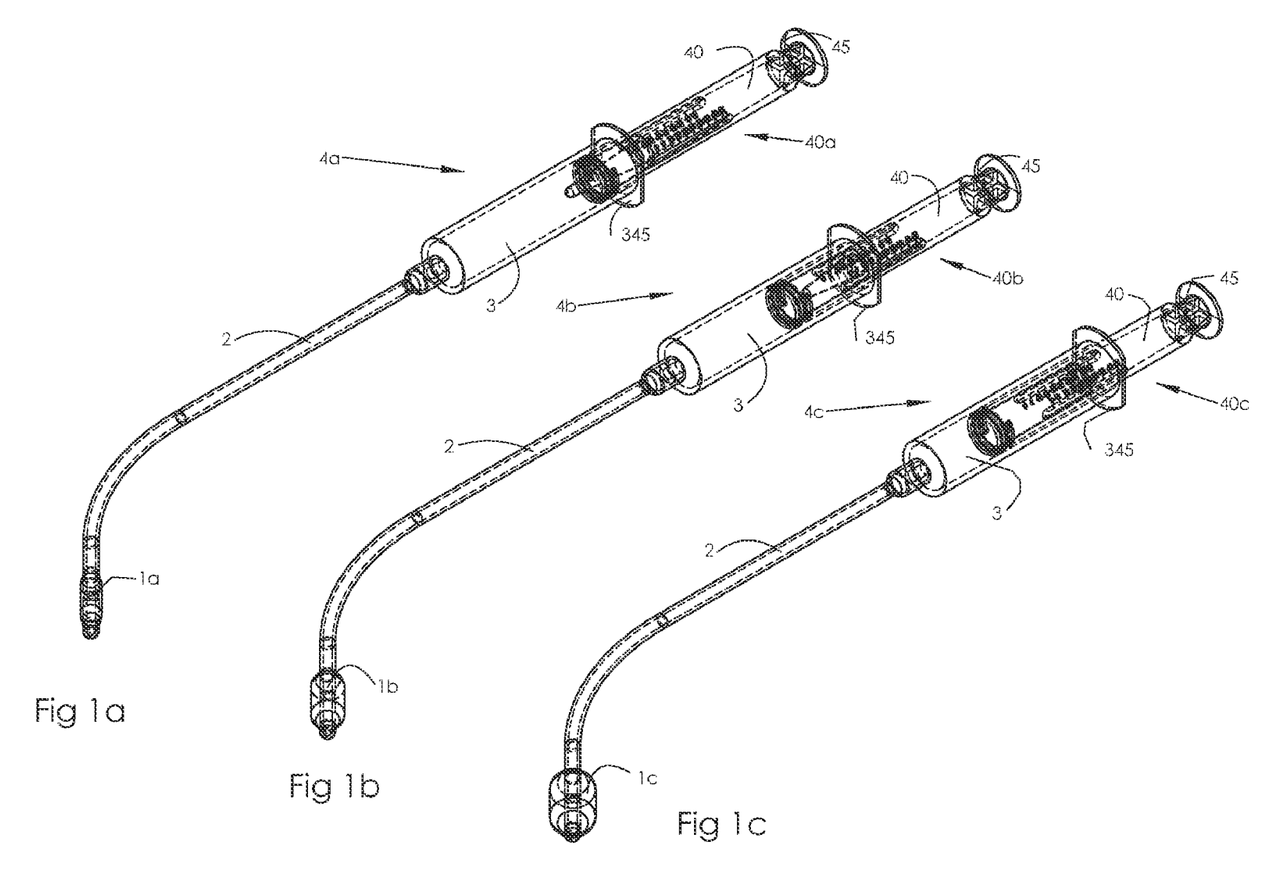
FIG. 1a is an isometric drawing showing the preferred embodiment in a pressure sensing syringe application where there is no pressure applied to a balloon such as an endotracheal cuff.
FIG. 1b is an isometric drawing showing the preferred embodiment in a pressure sensing syringe application where there is an intermediate pressure applied to partially inflate a balloon such as an endotracheal cuff.
FIG. 1c is an isometric drawing showing the preferred embodiment in a pressure sensing syringe application where there the final desired pressure applied to fully inflate a balloon such as an endotracheal cuff.

In the preferred embodiment shown in FIGS. 1a, 1b, and 1c, a pressure sensing syringe 4 is respectively shown in states 4a, 4b, and 4c of not inflating, partially inflating, and fully inflating a balloon such as an endotracheal cuff (balloons 1a, 1b, and 1c respectively). The barrel 3 of the syringe 4 is connected via a tube 2 to the balloon 1 (1a, 1b, 1c) by tube 2. Flange 345 on the barrel 3 resists an opposing force that would be applied to syringe plunger 40 end 45. In different stages of inflation from uninflated to partially inflated to fully inflated, the sensor areas 40a, 40b, and 40c respectively advances with the syringe plunger assembly 40a, 40b, and 40c. The syringe barrel would need to be made of clear plastic in order to see the pressure scale, or alternatively a longer outer tube length can be used for the rolling diaphragm pressure sensor so the zone of pressure measurement is always outside the syringe barrel, but then the dead space volume of the sensor would be increased. Hence it is up to the application which form is used.

FIGS. 2a, 2b, 2c, and 2d show the rolling diaphragm pressure sensor 30 (sensor) in its uninflated (0 cm H₂O) and partially inflated (15 cm, 30 cm, and 45 cm H₂O) conditions 30a, 30b, 30c, and 30d respectively. FIG. 3 is a cross section view of the rolling diaphragm pressure sensor 30 in its uninflated (0 cm H₂O) condition 30a. It has base 33 that has sealing rings 33a and 33b, and snap-fit protrusions 33c and 33c' (shown in FIG. 2a). The rolling diaphragms 37a (in FIGS. 3 and 37a-37d in FIGS. 2a-2d) represent their various states from unstrained to most strained corresponding here to pressure states being measured from 0 cm H₂O, 15 cm H₂O, 30 cm H2O and 45 cm H₂O respectively.

For the application of a pressure sensing syringe for inflating an endotracheal cuff, the outer tube 38 near the base 33 is about 12.5 mm in diameter and tapers inward with a cone angle of about 2 degrees, and the inner tube 39 tapers outward with a cone angle of about 8-4 degrees to a closed end diameter of about 3-6 mm. The wall thickness of the silicone rubber is about 0.2 mm, but could be as thick as 0.5 mm depending on the pressure sensing application. For higher pressures, it can be thicker or the tapers adjusted. The sensor will extend about 30 mm under 45 cm H₂O pressure if a soft rubber, such as a such as a silicone rubber, with an elastic modulus on the order of 10,000 N/m^2 is used.

Figure 4A:
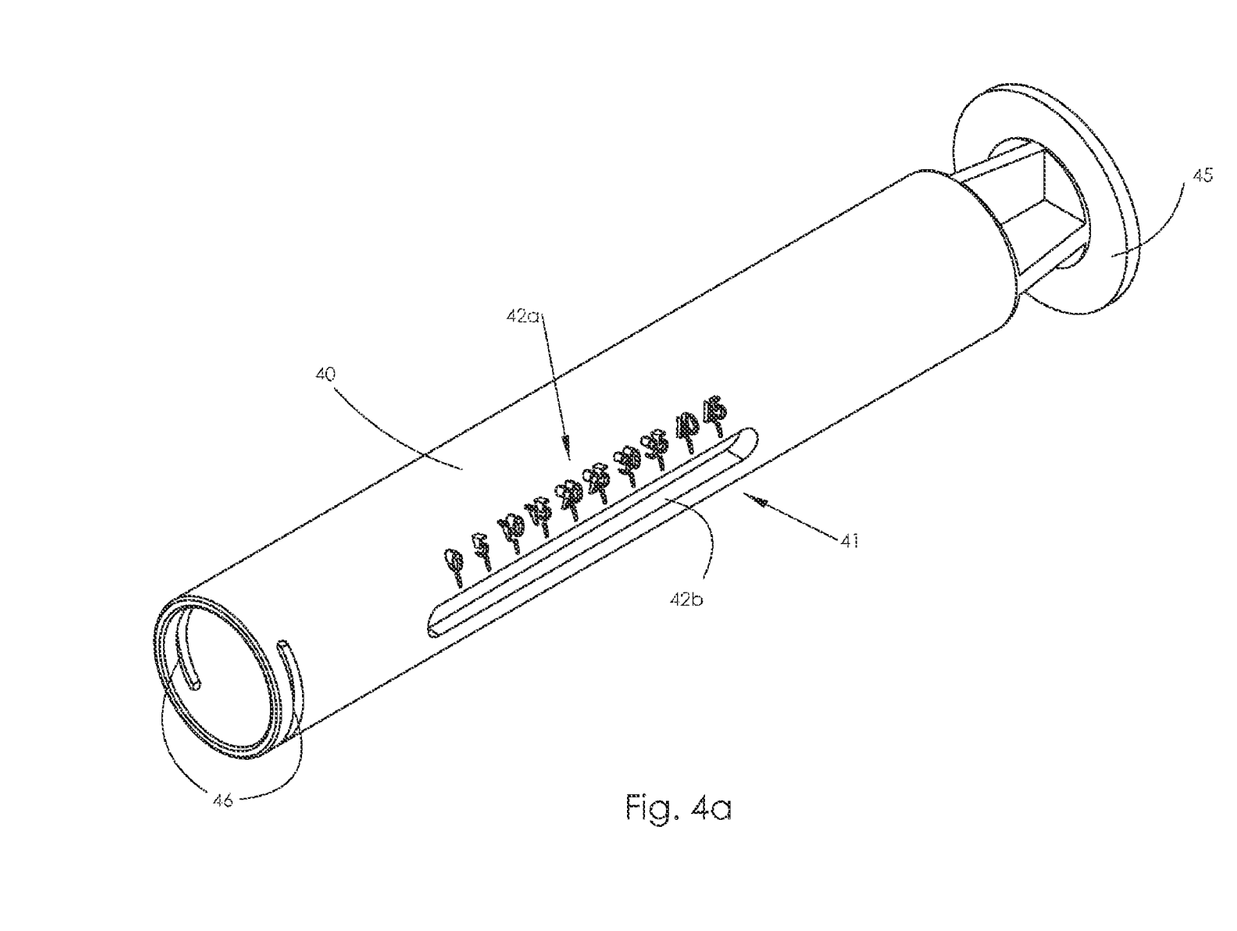
FIG. 4a is an isometric drawing showing the first embodiment of the plunger which is just a clear tube with axial markings along a viewing slit corresponding to pressure.

FIG. 4a shows a first embodiment of an enshrouding structure 40 (also referred to as the plunger in a syringe application). It has slits 46 near its base that axially and rotationally constrain the sensor via the sensor's snap-in tabs 33c and 33c'. The sensor region 41 is comprised of a slot 42b, which is not needed if the plastic is very clear, and a scale 42a which can be molded integral or inked on or even be a label applied. Only one side is shown here, and for ergonomic reasons, multiple sets placed circumferentially around the structure 40 body can be used. The sensor region needs to be located and scaled in accordance with the sensor's sensitivity and size. Shown here, it is sized and labeled to indicate centimeters of water pressure. Note that the sensor region 41 (and its mirror image) is aligned with the slots 46 so the part can easily be molded with two halves and a simple core.

Figure 4B:
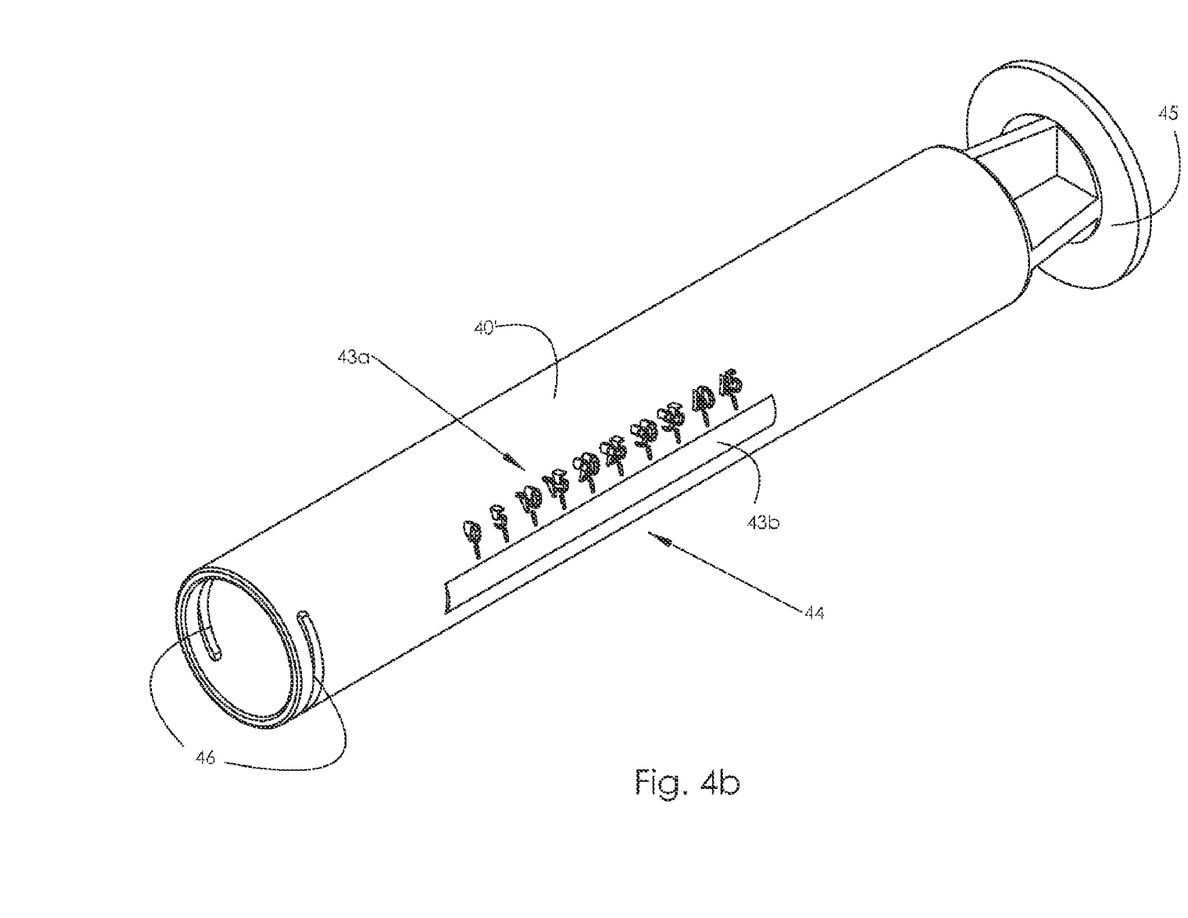
FIG. 4b is an isometric drawing showing the second embodiment of the plunger which is just a clear tube with axial markings corresponding to pressure alongside a cylindrical lens which acts to magnify the end of the sensor to more clearly show where it is with respect to the markings.
Figure 5A:
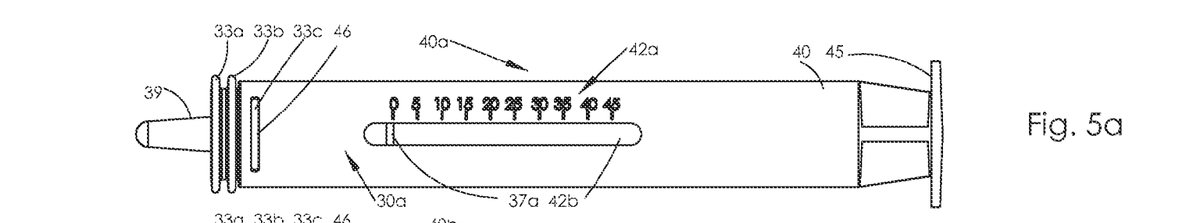
FIG. 5a is a side view drawing showing the first preferred embodiment of the syringe plunger with the rolling diaphragm pressure sensor if 0 cm H₂O pressure were applied internally.
Figures 5B, 5C:
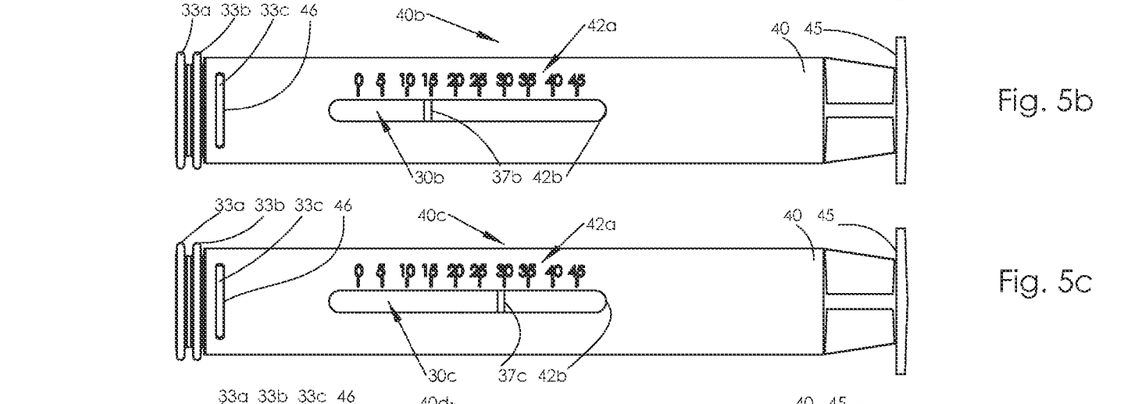
FIG. 5b is a side view drawing showing the first preferred embodiment of the syringe plunger with the rolling diaphragm pressure sensor if 15 cm H₂O pressure were applied internally.
FIG. 5c is a side view drawing showing the first preferred embodiment of the syringe plunger with the rolling diaphragm pressure sensor if 30 cm H₂O pressure were applied internally.
Figure 5D:
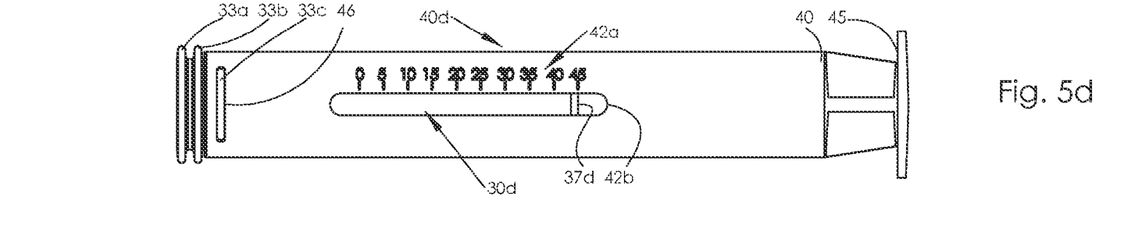
FIG. 5d is a side view drawing showing the first preferred embodiment of the syringe plunger with the rolling diaphragm pressure sensor if 45 cm H₂O pressure were applied internally.

FIG. 4b shows a second embodiment of an enshrouding structure 40' (also referred to as the plunger in a syringe application). It also has slits 46 near its base that axially and rotationally constrain the sensor via the snap-in tabs 33c and 33c'. The sensor region 44 is comprised of cylindrical lens structures 43b that help magnify the end position of the sensor and makes it easier to read the position of the end of the sensor with respect to the scale 43a. The scale 43a which can be molded integral or inked on or even be a label applied. Only one side is shown here, and for ergonomic reasons, multiple sets placed circumferentially around the structure 40' body can be used. The sensor region needs to be located and scaled in accordance with the sensor's sensitivity and size. Shown here, it is sized and labeled to indicate centimeters of water pressure. Note that the sensor region 44 (and its minor image) is aligned with the slots 46 so the part can easily be molded with two halves and a simple core.

FIGS. 5a-5d show the syringe plunger/sensor assemblies 40a-40d with pressures applied to the sensor of 0 cm H₂O, 15 cm H₂O, 30 cm H₂O and 45 cm H₂O respectively. As the sensor extends axially under pressure, the rolling diaphragms 37a, 37b, 37c, 37d corresponding to pressures 0 cm H₂O, 15 cm H₂O, 30 cm H₂O and 45 cm H₂O respectively align with the marks on the scales 42a. The sensor outer tube 38 will press against the inside diameter of the syringe plunger body 40. The linearity (or non-linearity) of the sensor can be controlled by the taper in the outer tube 38, inner tube 39 or in the wall thickness along the curve length from the base 33 to the end 39'.

An important feature is that the sensor can be incorporated into the plunger of a syringe were high sealing forces can not only provide an excellent seal, but can maintain plunger position when finger forces are removed from the plunger, but since the rolling diaphragm sensor is in effect parallel with the plunger with its distal end substantially free from contact with its enshrouding structure, the sensor will primarily experience forces created by the air pressure on the tube causing it to be relatively rigid and substantially free from contact with the enshrouding structure walls and thus give a true and accurate pressure reading proportional to its unrolled state.

Figure 2A:
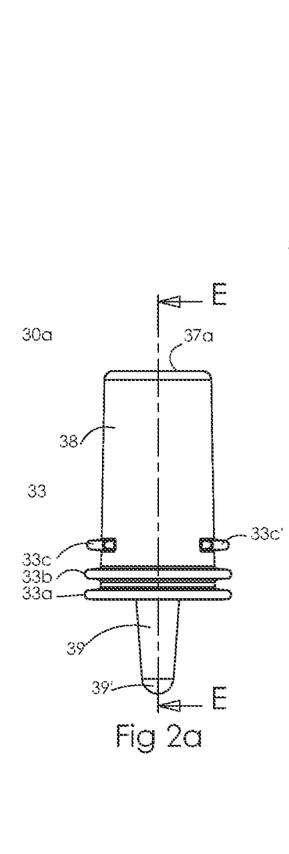
FIG. 2a is a plan view drawing showing the preferred embodiment if 0 cm $H_2O$ pressure were applied internally and a virtual radial constraint were applied to the outer tube surface.
Figure 2B:
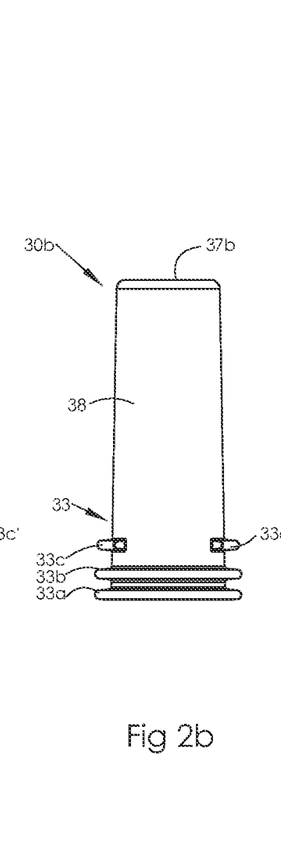
FIG. 2b is a plan view drawing showing the preferred embodiment if 15 cm $H_2O$ pressure were applied internally and a virtual radial constraint were applied to the outer tube surface.
Figure 2C:
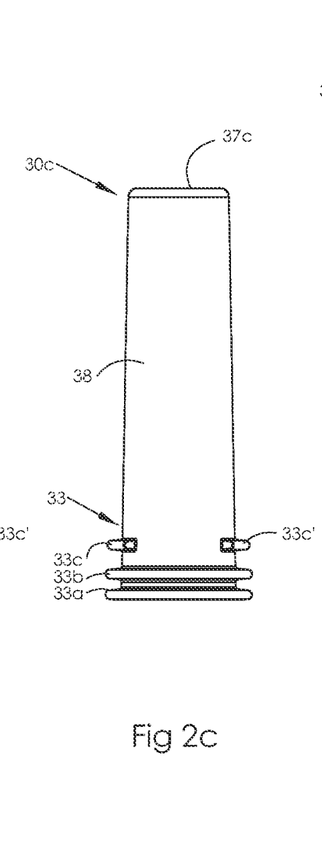
FIG. 2c is a plan view drawing showing the preferred embodiment if 30 cm H₂O pressure were applied internally and a virtual radial constraint were applied to the outer tube surface.
Figure 2D:
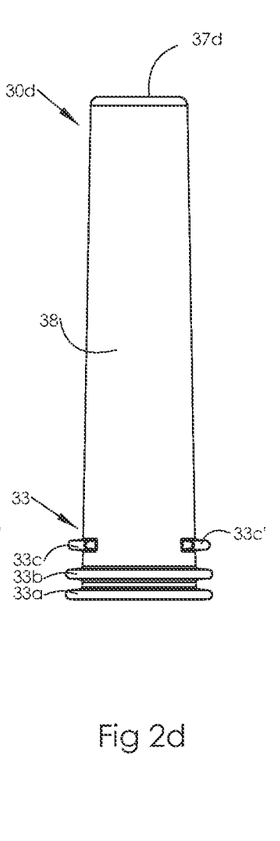
FIG. 2d is a plan view drawing showing the preferred embodiment if 45 cm H₂O pressure were applied internally and a virtual radial constraint were applied to the outer tube surface.
Figure 3:
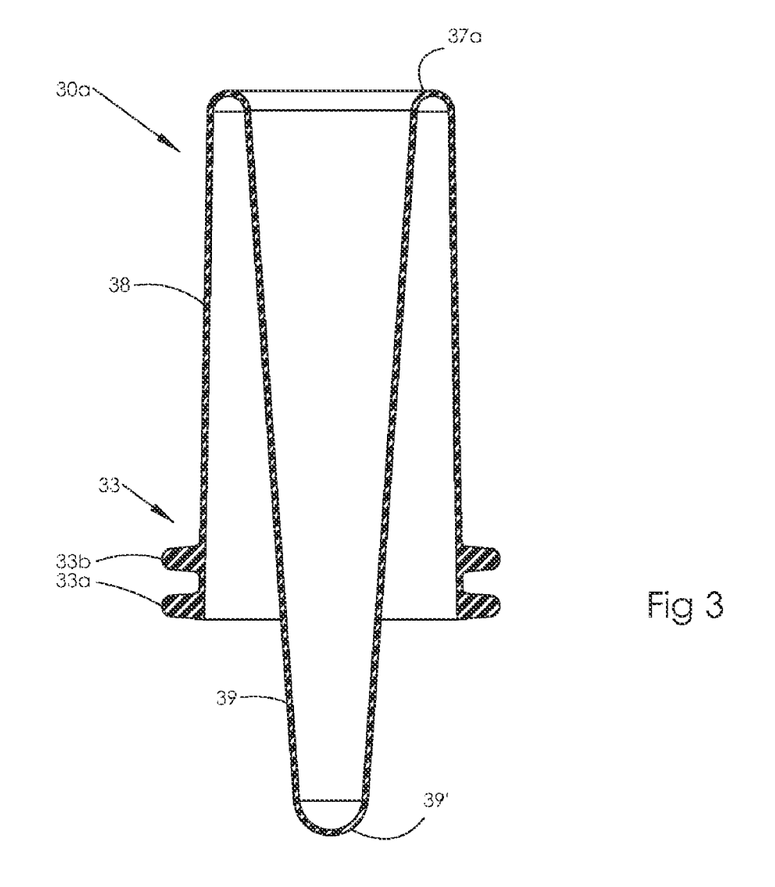
FIG. 3 is a cross section (EE) of FIG. 2a showing the preferred embodiment if 0 cm H₂O pressure were applied internally and a virtual radial constraint were applied to the outer tube surface.

The preferred method of manufacture is to mold the sensor 30 in the state of FIG. 2a. Note that in this state shown the end 39' protrudes below the end 33, but this need not be the case: the relative lengths of the inner and outer tubes can be adjusted to form any desired offset. To investigate the effects of varying geometric parameters, finite element analysis (FEA) can be used. For example, Tables 1 and 2 show how it is used to determine compliances about various geometric conditions, in this case for a small 6.25 mm outer diameter sensor which could be made into a element that attaches with a Y-connection to a tube attached to the end of a syringe, and thereby it would measure pressure as the syringe applies it to the line. The tables show how if the wall thickness is held constant, the outer tube needs to taper inwards in order to require increasing pressure to roll the diaphragm and visually change the length of the sensor. Table 1 illustrates the condition for tapering inward (the diameter gets smaller as pressure is applied and the outer tube extends) the outer tube. Table 2 also can be used to study the effect of varying wall thickness due to manufacturing variability on sensor accuracy, and thereby be used to specify wall thickness tolerances for quality control.

TABLE 1

Effect of taper angle direction on compliance

| | taper angle (deg) | wall thickness (mm) | outer wall length (mm) | Pressure compliance (mm/Pa) | displacement (mm) |
|---|---|---|---|---|---|
| outward taper, fixed wall thickness, varying extension | −1 | 0.25 | 20 | 0.0163 | 0.0163 |
| | −1 | 0.25 | 25 | 0.0153 | 0.0153 |
| | −1 | 0.25 | 30 | 0.0144 | 0.0144 |
| | −1 | 0.25 | 35 | 0.0135 | 0.0135 |
| no taper, fixed wall thickness, varying extension | 0 | 0.25 | 20 | 0.0212 | 0.0212 |
| | 0 | 0.25 | 25 | 0.0214 | 0.0214 |
| | 0 | 0.25 | 30 | 0.0215 | 0.0215 |
| | 0 | 0.25 | 35 | 0.0217 | 0.0217 |
| inward taper, fixed wall thickness, varying extension | 1 | 0.25 | 20 | 0.0266 | 0.0266 |
| | 1 | 0.25 | 25 | 0.0282 | 0.0282 |
| | 1 | 0.25 | 30 | 0.0300 | 0.0300 |
| | 1 | 0.25 | 35 | 0.0317 | 0.0317 |

TABLE 2

Geometric parameter effect on compliance

| | taper angle (deg) | wall thickness (mm) | outer wall length (mm) | Pressure compliance (mm/Pa) | displacement (mm) |
|---|---|---|---|---|---|
| fixed taper angle, fixed wall thickness, varying extension | 1 | 0.25 | 20 | 0.0163 | 0.0163 |
| | 1 | 0.25 | 25 | 0.0153 | 0.0153 |
| | 1 | 0.25 | 30 | 0.0144 | 0.0144 |
| | 1 | 0.25 | 35 | 0.0135 | 0.0135 |
| fixed taper angle, varying wall thickness, fixed extension | 1 | 0.25 | 20 | 0.0163 | 0.0163 |
| | 1 | 0.275 | 20 | 0.01301 | 0.01301 |
| | 1 | 0.3 | 20 | 0.0107 | 0.0107 |
| | 1 | 0.325 | 20 | 0.00881 | 0.00881 |
| | 1 | 0.35 | 20 | 0.00735 | 0.00735 |
| varying taper angle, fixed wall thickness, fixed extension | 1 | 0.25 | 20 | 0.0163 | 0.0163 |
| | 1.5 | 0.25 | 20 | 0.014 | 0.014 |
| | 2 | 0.25 | 20 | 0.0119 | 0.0119 |
| | 2.5 | 0.25 | 20 | 0.0101 | 0.0101 |

The options for taper are summarized in table 3 and demonstrate the great design flexibility a design engineer has at their disposal to obtain the desired performance from the sensor. Generally to facilitate molding options d or e are preferred, and note that constant wall thickness can facilitate molding repeatability; however, the other options do allow for great design flexibility.

TABLE 3

Taper option

| | a | b | c | d | e | f | g |
|---|---|---|---|---|---|---|---|
| outer tube | yes | no | no | yes | yes | no | yes |
| inner tube | no | yes | no | yes | yes | yes | no |
| thickness | no | no | yes | no | yes | yes | yes |

Further modifications of the invention will also occur to persons skilled in the art, and all such are deemed to fall within the spirit and scope of the invention as defined by the appended claims.

What is claimed:
1. A pressure measuring device, comprising:
a resilient rolling diaphragm pressure sensor element having an open end and an opposite closed end, said pressure sensor element comprising generally concentric inner and outer substantially tubular portions and a rolling diaphragm portion connecting the inner and outer substantially tubular portions, said outer substantially tubular portion extending from the open end of the pressure sensor element and said inner substantially tubular portion defining the closed end of the pressure sensor element, wherein the pressure sensor element is tapered over at least a portion of its length or has a wall thickness that varies over at least a portion of its length to tune its response to pressure; and
a supporting structure having a pressure indicating scale, said supporting structure holding the pressure sensor element such that the open end of the pressure sensor element is in communication with a fluid whose pressure is to be measured and pressure applied by the fluid causes the pressure sensor element to expand axially and the rolling diaphragm portion of the pressure sensor element to be visibly displaced relative to the pressure indicating scale by a distance related to the pressure applied by the fluid.

2. The pressure measuring device of claim 1, wherein said pressure indicating scale includes one or more pressure value indicators.

3. The pressure measuring device of claim 1, wherein the pressure sensor element comprises rubber.

4. The pressure measuring device of claim 1, wherein the supporting structure enshrouds the pressure sensor element and comprises a generally clear material enabling a user to view displacement of the rolling diaphragm portion in the structure.

5. The pressure measuring device of claim 1, wherein the supporting structure includes a magnification element to enhance a user's view of the displacement of the rolling diaphragm portion in the structure.

6. The pressure measuring device of claim 1, wherein the supporting structure comprises a plunger of a pressure measuring syringe, and wherein the pressure measuring syringe further comprises an outer syringe barrel into which said plunger moves, and fluid seals between said plunger and said barrel.

7. The pressure measuring device of claim 6, wherein sealing forces between the plunger and the outer syringe barrel of the syringe create static friction forces to maintain axial position of the plunger when user finger forces are removed from the plunger.

8. The pressure measuring device of claim 1, wherein the open end of the pressure sensor element includes one or more protrusions held by one or more openings in the supporting structure.

9. The pressure measuring device of claim 1, wherein the open end of the pressure sensor element includes one or more sealing rings engaging an inner wall of the supporting structure.

10. A pressure measuring syringe, comprising:
a syringe barrel;
a syringe plunger including a proximal end that can be manipulated by a user and an opposite distal end slidably disposed in the syringe barrel, said syringe plunger including a pressure indicating scale; and
a rolling diaphragm pressure sensor element disposed in the syringe plunger, said pressure sensor element having an open end and an opposite closed end, said pressure sensor element comprising generally concentric inner and outer substantially tubular portions and a rolling diaphragm portion connecting the inner and outer substantially tubular portions, said outer substantially tubular portion extending from the open end of the pressure sensor element and said inner substantially tubular portion defining the closed end of the pressure sensor element, said open end of the pressure sensor element being attached to an open end of the syringe plunger distal to a user such that the open end of the pressure sensor element is in communication with a fluid whose pressure is to be measured and pressure applied by the fluid causes the pressure sensor element to expand axially and the rolling diaphragm portion to be visibly displaced relative to the pressure indicating scale by a distance related to the pressure applied by the fluid, wherein the pressure sensor element is tapered over at least a portion of its length or has a wall thickness that varies over at least a portion of its length to tune its response to pressure.

11. The pressure measuring syringe of claim 10, wherein the syringe is adapted to inflate an endotracheal tube cuff.

12. The pressure measuring syringe of claim 10, wherein said pressure indicating scale includes one or more pressure value indicators.

13. The pressure measuring syringe of claim 10, wherein the pressure sensor element comprises rubber.

14. The pressure measuring syringe of claim 10, wherein the plunger comprises a material enabling a user to view displacement of the rolling diaphragm portion held by the plunger.

15. The pressure measuring syringe of claim 10, wherein the plunger includes a magnification element to enhance a user's view of the displacement of the rolling diaphragm portion held by the plunger.

16. The pressure measuring syringe of claim 10, wherein sealing forces between the plunger and the syringe barrel create static friction forces to maintain axial position the plunger when user finger forces are removed from the plunger.

17. The pressure measuring syringe of claim 10, wherein the open end of the pressure sensor element includes one or more protrusions held by one or more openings in the plunger.

18. The pressure measuring syringe of claim 10, wherein the open end of the pressure sensor element includes one or more sealing rings engaging an inner wall of the plunger.

19. A method of making a pressure sensor, comprising the steps of:
forming a resilient rolling diaphragm pressure sensor element having an open end and an opposite closed end, said pressure sensor element comprising generally concentric inner and outer substantially tubular portions and a rolling diaphragm portion connecting the inner and outer substantially tubular portions, said outer substantially tubular portion extending from the open end of the pressure sensor element and said inner substantially tubular portion defining the closed end of the pressure sensor element, wherein the pressure sensor element is tapered over at least a portion of its length or has a wall thickness that varies over at least a portion of its length to tune its response to pressure; and
attaching the open end of the pressure sensor element to a supporting structure having a pressure scale, wherein when the open end of the pressure sensor element is placed in communication with a fluid whose pressure is to be measured, pressure applied by the fluid causes the pressure sensor element to axially expand and the rolling diaphragm portion of the pressure sensor element to be visibly displaced relative to the pressure indicating scale by a distance related to the pressure applied by the fluid.

20. The method of claim 19, wherein forming the rolling diaphragm pressure sensor element comprises molding the pressure sensor element.

21. The method of claim 19, wherein the supporting structure comprises a plunger of a pressure measuring syringe.

* * * * *